(12) United States Patent
Yang

(10) Patent No.: US 9,079,346 B2
(45) Date of Patent: Jul. 14, 2015

(54) APPARATUS AND METHOD FOR PREPARING LAMINATED NANO-COMPOSITE MATERIAL

(75) Inventor: Weimin Yang, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 474 days.

(21) Appl. No.: 13/475,855

(22) Filed: May 18, 2012

(65) Prior Publication Data

US 2012/0273991 A1 Nov. 1, 2012

Related U.S. Application Data

(63) Continuation of application No. PCT/CN2010/078873, filed on Nov. 18, 2010.

(30) Foreign Application Priority Data

Nov. 20, 2009 (CN) .......................... 2009 1 0237622
Aug. 6, 2010 (CN) .......................... 2010 1 0246370

(51) Int. Cl.
  *B29C 47/06* (2006.01)
  *B29C 47/70* (2006.01)
  (Continued)

(52) U.S. Cl.
  CPC ........... *B29C 47/707* (2013.01); *B29C 45/1603* (2013.01); *B29C 47/56* (2013.01);
  (Continued)

(58) Field of Classification Search
  CPC combination set(s) only.
  See application file for complete search history.

(56) References Cited

U.S. PATENT DOCUMENTS 5,843,350 A * 12/1998 Maeda et al. ................ 264/40.5
8,388,331 B2 * 3/2013 Osada et al. ............... 425/133.5
(Continued)

FOREIGN PATENT DOCUMENTS

CN 2897642 Y 5/2007
CN 200970885 Y 11/2007
(Continued)

OTHER PUBLICATIONS

International Searching Authority, "Search Report", issued in connection with PCT patent application No. PCT/CN2010/078873, mailed on Feb. 24, 2011, 5 pages.
(Continued)

*Primary Examiner* — James Sanders
(74) *Attorney, Agent, or Firm* — Hanley, Flight and Zimmerman, LLC

(57) ABSTRACT

Apparatus and method for preparing laminated nano-composite material. The apparatus comprising: a plasticizing-and-feeding device assembly consisting of n plasticizing-and-feeding devices; a current collector having n inlets, one outlet and a conjunction runner; k laminated composite generators connected in series, wherein each generator comprises one melt inlet channel, m branch laminated runners and one melt outlet channel, while the vicinity of each melt inlet channel is provided with m distributary openings, and each branch laminated runner can make each equal composite melt that flows out from each distributary opening rotate approximately 90 degrees and extend in width as it flows forward, and then join together and form a laminated structure melt, and the laminated structure melt which joins together at the melt outlet channel of the last laminated composite generator has $n \times m^k$ layers; and a forming device connected in series to the melt outlet channel of the last generator.

8 Claims, 6 Drawing Sheets

(51) Int. Cl.
*B29C 47/56* (2006.01)
*B29C 45/16* (2006.01)
*B32B 27/08* (2006.01)
*B29C 47/00* (2006.01)
*B29C 47/14* (2006.01)
*B29K 105/16* (2006.01)

(52) U.S. Cl.
CPC ............ *B32B 27/08* (2013.01); *B29C 47/0021* (2013.01); *B29C 47/065* (2013.01); *B29C 47/145* (2013.01); *B29K 2105/162* (2013.01)

(56) References Cited

U.S. PATENT DOCUMENTS

2003/0201565 A1* 10/2003 Cloeren .................. 264/173.16
2008/0315449 A1 12/2008 Guillemette et al.
2010/0072655 A1* 3/2010 Roberts et al. ........... 264/171.13

FOREIGN PATENT DOCUMENTS

| CN | 100553937 C | 10/2009 |
| CN | 201587107 U | 9/2010 |
| DE | 10311134 A1 | 9/2004 |
| WO | 2011060724 A1 | 5/2011 |

OTHER PUBLICATIONS

International Searching Authority, "Written Opinion", issued in connection with PCT patent application No. PCT/CN2010/078873, mailed on Feb. 24, 2011, 6 pages.

International Searching Authority, "International Preliminary Report on Patentability", issued in connection with PCT patent application No. PCT/CN2010/078873, mailed on May 22, 2012, 7 pages.

* cited by examiner

APPARATUS AND METHOD FOR PREPARING LAMINATED NANO-COMPOSITE MATERIAL

RELATED APPLICATIONS

This patent arises from the U.S. national stage application of International Patent Application PCT/CN2010/078873, having an International Filing Date of Nov. 18, 2010, which is hereby incorporated by reference in its entirety. International Patent Application PCT/CN2010/0788873 claims priority from Chinese Patent Application No. 200910237622.5, filed on Nov. 20, 2009, and Chinese Patent Application No. 201010246370.5, filed on Aug. 6, 2010. The above-referenced applications are hereby incorporated by reference in their entireties.

FIELD OF THE DISCLOSURE

The present disclosure relates to the field of polymer material forming processing, and particularly, to an apparatus and a method for preparing laminated nano-composite material, which prepare multi-layer composite structure polymer materials and products using a method of composite extrusion or composite injection molding.

BACKGROUND

Due to the distinct advantages in the aspects such as mechanical property, barrier property, electrical conductivity and optical property, the laminated nano-composite material has a promising application prospect and attracts more and more attentions. Usually, the micro-laminated nano-composite material with high barrier property is produced and processed using the methods such as dry composition, multi-layer co-extrusion and in-mold lamination.

The multi-layer co-extrusion composition methods disclosed by the Chinese patents No. CN2897642 and No. CN200620101646.X have the advantages of raw materials saving and diversifiable. However, the traditional technology of multi-layer co-extrusion composition also has its disadvantages, i.e., the number of layers is small and the layer thickness cannot be too thin, and the usage amount of the barrier material shall be increased in case the barrier property of the composite material needs to be improved, thereby increasing the production cost.

The Chinese patent No. CN200610022348.6 discloses a branch laminator which produces laminated composite materials using an in-mold lamination method. The current in-mold lamination methods basically belong to the type of extrusion die. With respect to the layering principle, the early technical solution mainly adopts the multi-channel mode in which each channel controls one layer. The structure design is too complex, the number of layers is small, the final composite material has the adhesive layer on the surface, and the thicknesses of respective layers are uneven, thus the service properties of the material will be influenced.

Thus, in order to obtain laminated micro-nano-composite material with excellent properties, a more effective solution shall be found to overcome the above defects.

The above technical contents are incorporated herein by reference.

SUMMARY

An object of the present disclosure is to provide an apparatus for preparing laminated nano-composite material, which has higher division efficiency, achieves a better flow symmetry, and causes less pressure loss during the layering process.

Another object of the present disclosure is to provide a method for preparing laminated nano-composite material, which has higher division efficiency, achieves a better flow symmetry, and causes less pressure loss during the layering process.

The above objects can be implemented by the following technical solutions:

An apparatus for preparing laminated nano-composite material, comprising: a plasticizing-and-feeding device assembly having n plasticizing-and-feeding devices; a current collector having n inlets and an outlet, wherein each of the inlets are in communication with corresponding ones of the plasticizing-and-feeding devices, and there is a conjunction runner between the inlet and the outlet to laminate more than one layers of polymer melts into a first composite melt; k laminated composite generators in serial communication with each other, a first laminated composite generator in serial communication with the outlet of the current collector, each of the laminated composite generators comprises a melt inlet channel, m branch laminated runners and a melt outlet channel, in the vicinity of each of the melt inlet channel m distributary openings are distributed substantially evenly in a width direction to divide the first composite melt into m substantially equal second composite melts, each of the branch laminated runners to enable each equal second composite melt flowing out from each of the distributary openings to rotate approximately 90 degrees, to expand m times as each second composite melt flows forward, and to join together and form a laminated structure melt at the melt outlet channel, the laminated structure melt formed at the melt outlet channel of a last laminated composite generator to have $n \times m^k$ layers, wherein n and m are integers of no less than 2, and k is an integer of no less than 1; and a forming device connected to the melt outlet channel of the last laminated composite generator in series.

A method for preparing laminated nano-composite material, comprising: feeding materials into n plasticizing-and-feeding device to be processed substantially into uniform fluids, then transported to the current collector by the plasticizing-and-feeding device, and the fluids substantially uniformly join together at the conjunction runners in the current collector and form a multi-layered composite melt with substantially uniform wall thickness. From the outlet of the current collector the composite melt enters k laminated composite generators connected in series, each comprising a melt inlet channel, m branch laminated runners and a melt outlet channel, in the vicinity of each melt inlet channel the composite melt is evenly divided into m equals in the width direction, each equal composite melt rotates approximately 90 degrees and expands for m times as it flows forward in corresponding branch laminated runner, and joins together again and forms a laminated structure melt at the melt outlet channel, the laminated structure melt formed at the melt outlet channel of the last laminated composite generator has $n \times m^k$ layers, wherein n and m are integers of no less than 2, and k is an integer of no less than 1; the laminated structure melt flowing out from the melt outlet channel of the last laminated composite generator enters the forming device for being processed and shaped into a product.

In the embodiment of the present disclosure, due to the runner characteristic that the melt rotates approximately 90 degrees after being divided and then expands, the branch laminated runners between respective layers are identical to each other, have well interlayer symmetry, the melt may expand from the middle to the outside, and the melt flows substantially uniformly, thereby breaking the limitation of the prior art. Meanwhile, due to the design of rotating the divided melt approximately 90 degrees, the laminated runners can easily keep the symmetrical structures during the flow expanding and thinning process. The design and manufacturing technologies are simple, the accuracy can be easily ensured, and the adaptability to the materials is also greatly improved.

BRIEF DESCRIPTION OF THE DRAWINGS

In order to more clearly describe the technical solutions of the embodiments of the present disclosure, the drawings to be used in the descriptions of the embodiments are briefly introduced as follows. Obviously, the following drawings just illustrate some embodiments of the present disclosure, and a person skilled in the art can obtain other drawings based on these drawings, without paying any creative effort.

DETAILED DESCRIPTION OF THE PREFERRED EMBODIMENTS

The technical solutions of the embodiments of the present disclosure will be clearly and completely described as follows with reference to the drawings. Obviously, the described embodiments are just a part of the embodiments of the present disclosure rather than all the embodiments thereof. Any embodiment obtained by a person skilled in the art based on the embodiments of the present disclosure without paying any creative effort shall be covered by the protection scope of the present disclosure.

Embodiment 1

Figure 1:
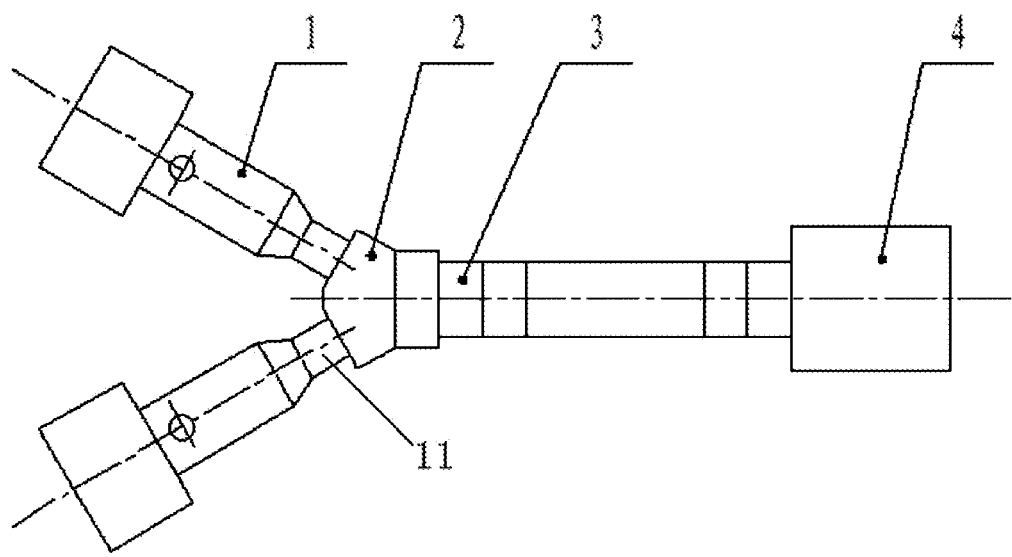
FIG. 1 is a structure diagram of an apparatus for preparing laminated nano-composite material according to an embodiment of the present disclosure.
Figure 2:
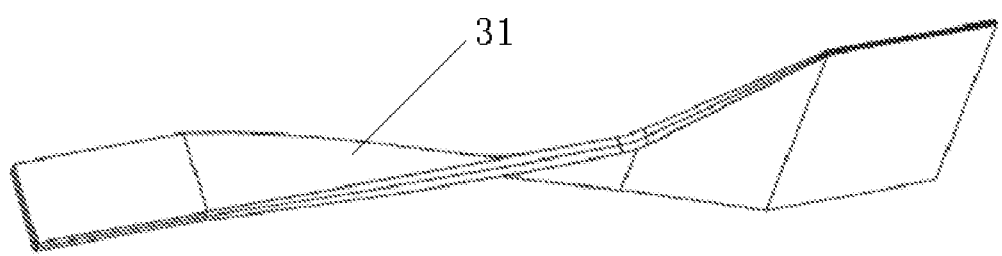
FIG. 2 is a structure diagram of an apparatus for preparing laminated nano-composite material according to an embodiment of the present disclosure in one of branch laminated runners of a laminated composite generator, wherein a certain segment of composite melt may rotate approximately 90 degrees and expand.
Figure 3:
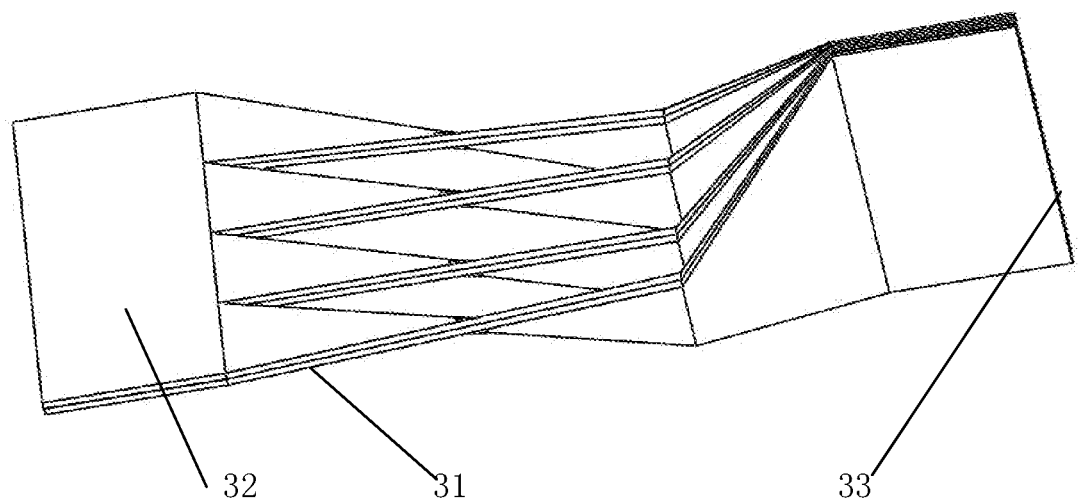
FIG. 3 is a structure diagram of an apparatus for preparing laminated nano-composite material according to an embodiment of the present disclosure in several branch laminated runners of a laminated composite generator, and it illustrates the principle of laminated composition.

Referring to FIGS. 1-4, the embodiment of the present disclosure provides an apparatus for preparing laminated nano-composite material, comprising a plasticizing-and-feeding device assembly, a current collector 2, k laminated composite generators 3, and a forming device 4. The plasticizing-and-feeding device assembly comprises n plasticizing-and-feeding devices 1. The current collector 2 comprises n inlets and one outlet, wherein each inlet is in communication with one plasticizing-and-feeding device 1, and there is a current collector channel between the inlet and the outlet to laminate more than one layers of polymer melts into one layer of composite melt. The k laminated composite generators 3 are in serial communication with each other, and a first laminated composite generator 3 is in serial communication with the outlet of the current collector 2 in series. Each laminated composite generator 3 comprises a melt inlet channel, m branch laminated runners 31 and a melt outlet channel. In the vicinity of each melt inlet channel, m distributary openings are distributed substantially evenly in the width direction. Each branch laminated runner enables each equal composite melt flowing out from each distributary opening to rotate approximately 90 degrees and expand for m times as it flows forward, and join together and form a laminated structure melt at the melt outlet channel, as illustrated in FIGS. 2-3. The laminated structure melt formed at the melt outlet channel of the last laminated composite generator 3 has $n \times m^k$ layers, wherein n and m are integers of no less than 2, and k is an integer of no less than 1. The forming device 4 is serially connected to the melt outlet channel of the last laminated composite generator 3.

In which, the embodiment arranges the m distributary openings in the vicinity of each melt inlet channel. Herein "in the vicinity of the melt inlet channel" refers to being located on the melt inlet channel or on the outlet channel of a component adjacent to the melt inlet channel, and "the outlet channel of a component adjacent to the melt inlet channel" may specifically refer to the outlet of the current collector 2 or the melt outlet channel of the previous adjacent laminated composite generator. The m distributary openings are arranged for the purpose of evenly dividing the composite melt into m equals before it enters the branch laminated runner of the laminated composite generator, so that each equal melt enters corresponding branch laminated runner.

That is, "m distributary openings are arranged in the vicinity of each melt inlet channel" for example may be the following cases: each melt inlet channel is provided with the m distributary openings; alternatively, the outlet of the current collector is provided with m distributary openings, and the melt outlet channels of the previous (k−1) laminated composite generators are provided with m distributary openings; and alternatively, the outlet of the current collector is provided with m distributary openings, and the melt inlet channels of the $2^{nd}$ to $k^{th}$ laminated composite generators are provided with m distributary openings.

The melt inlet channel of the laminated composite generator 3 has the same size as the melt outlet channel rotated approximately 90 degrees.

As can be seen from the above embodiment, in case there is one laminated composite generator 3, the outlet of the current collector 2 or the melt inlet channel is provided with m distributary openings, and the composite melt is evenly divided into m equals. Each equal melt enters corresponding branch laminated runner, then it rotates approximately 90 degrees in the branch laminated runner and expands for m times, and joins together and forms a laminated structure melt of n×m layers at the melt outlet channel.

For example, the polymer melts of two compositions join together at the current collector 2 and then pass through five-equal laminated composite generators, wherein six identical laminated composite generators are in serial communication with each other (i.e., n=2, m=5, k=6), thus a composite laminated structure melt with $2 \times 5^6 = 31250$ layers in total is finally obtained. The layered melt is extruded from the outlet of the forming device with a thickness of 1 mm, and the average interlayer thickness of the two polymer materials is 32 nm. In case the melt is further tensioned to be 0.1 mm thick, the interlayer thickness of each polymer material of the composite material may reach 3.2 nm. For another example, the polymer melts of two compositions join together and then pass through four-equal laminated composite generator 3, wherein eight identical laminated composite generators 3 are in serial communication with each other, so as to obtain a composite material with $2 \times 4^8 = 131072$ layers. In case the multi-layer composite material is extruded into the sheets with a thickness of 1 mm, the interlayer thickness of the composite material may reach 7.63 nm. Therefore, nano-composite materials with the interlayer thickness less than 100 nm can be easily prepared using the present apparatus.

In the embodiment of the present disclosure, the following runner characteristic is employed: the melt rotates approximately 90 degrees after being divided, and then expands. Thus the branch laminated runners between respective layers are identical to each other, the interlayer symmetry is good, the melt may expand from the middle to the outside, and the melt flows substantially uniformly, thereby breaking the limitation of 'one divided into two' in the prior art, and realizing 'one divided into three to ten or even more'. For example, 'one divided into four' achieves the same layer number just using half of serially connected units employed by 'one divided into two', correspondingly, the pressure loss is greatly reduced. Thus 'one divided into four' may also be used in the injection molding that requires a high speed filling flow. Meanwhile, due to the design of rotating the divided melt approximately 90 degrees, the laminated runners can easily keep the symmetrical structures during the flow expanding and thinning process. The designing and manufacturing processes are simple, the accuracy can be easily ensured, and the adaptability to the materials is also greatly improved.

Further, in the embodiment of the present disclosure, due to the structure of the laminated composite generator 3, the difficulty in processing the current collector 2 and the forming device 4 is reduced, and the division and convergence can be completed in the laminated composite generator 3. There is only one channel to engage with the interface, thus the sealing is easy to be realized, and it is likely to ensure the melt flow balance between respective branches.

In the embodiment of the present disclosure, the current collector 2 laminates n layers of melts coming from n plasticizing-and-feeding device 1 into one layer of composite melt, and the interlayer thicknesses may be the same as or different from each other. The interlayer thicknesses are ensured by the interlayer runner gaps, i.e., respective layers of the final product have the same thickness when the channel gaps are identical to each other during the convergence, and respective layers of the final product have different thicknesses if the channel gaps are not identical to each other during the convergence.

The branch laminated runners of the laminated composite generator 3 may be processed through a precision casting or an electroplating. Alternatively, the laminated composite generator 3 may be cut into slices, and each slice undergoes a numerical control machining to obtain the required channel shape, and then assembled into the laminated composite generator 3 after the slicing processing.

According to an embodiment of the present disclosure, the plasticizing-and-feeding device 1 may be an extruder, an injection molding device of an injection molding machine or a die casting machine.

A connector 11 may be connected between each inlet of the current collector 2 and each plasticizing-and-feeding device 1. The runner in the connector 11 is a rectangular channel which gradually transits from the inlet segment runner in correspondence with the outlet of the plasticizing-and-feeding device 1 to the outlet segment runner. In case the plasticizing-and-feeding device 1 is an extruder, the inlet segment runner of the connector 11 is a cylindrical runner.

Figure 4:
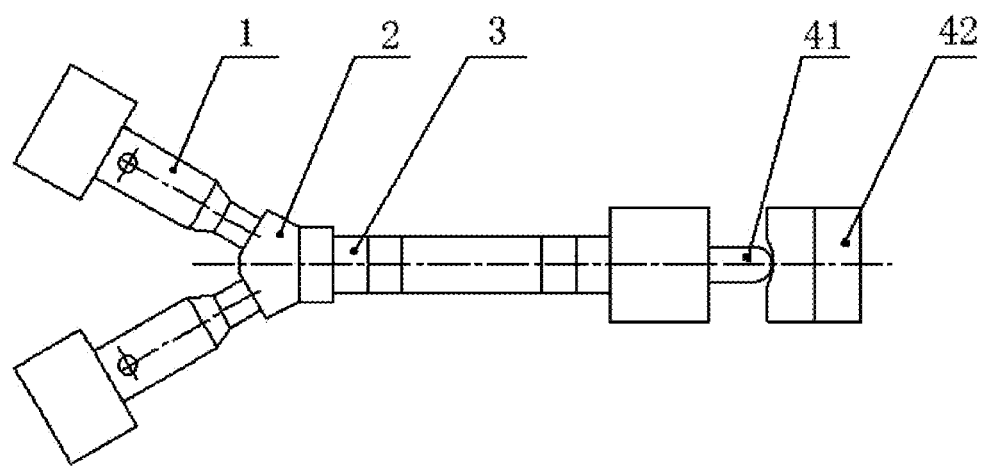
FIG. 4 is another structure diagram of an apparatus for preparing laminated nano-composite material according to an embodiment of the present disclosure, in which the forming device uses injection molding.

The forming device 4 may be an extruder head, a pressing die or a combination of injection nozzle and die. The forming device illustrated in FIG. 4 is a serial combination of injection nozzle and die, and a nozzle 41 is connected to a die 42 during the injection molding. The main function of the laminated composite generator 3 is to evenly divide n layers of polymer melts 32 extruded from the current collector 2 into m equals in the width direction, wherein each equal melt rotates approximately 90 degrees and expands for m times as it flows forward in the branch laminated runner 31, and joins together and forms a laminated structure melt 33 of n×m layers at the melt outlet channel. Herein the laminated structure melt joining together at the last laminated composite generator 3 flows out from the melt outlet channel, then it is injected into the cavity of the die 42 through the nozzle 41, and cooled and shaped to obtain an injection molding product of the polymer laminated composite materials.

The material loaded by the plasticizing-and-feeding device 1 may be polymer-based, ceramic-based or metal-based composite material.

The embodiment of the present disclosure can be widely employed to prepare various layered nano-composite materials under the molten blending processing. For example in the field of polymer composite material, films, plates and profiles can be directly produced and master batches may also be produced. The embodiment of the present disclosure can also be applied to the field such as ceramic-based or metal-based composite material. The laminated nano-composite generator of the embodiment of the present disclosure may be used in cooperation with an injection molding machine or a die casting machine which has more than two plasticizing-and-feeding devices, so as to directly process the layered composite product.

Embodiment 2

In the embodiment of the present disclosure, the laminated composite generator 3 may be a reverse laminator 34, and the number thereof is larger than or equal to 1. In m branch laminated runners of the reverse laminator 34, at least one branch laminated runner is the reverse branch laminated runner. For example, the branch laminated runner near to the outer side may be a reverse branch laminated runner while others are homodromous branch laminated runners. The rotation directions of the composite melts continually flowing forwards in the reverse branch laminated runners are reverse to those of the composite melts continuing flowing forwards in the homodromous branch laminated runners, and the rotation directions of the composite melts continuing flowing forwards in the homodromous branch laminated runners are the same as each other.

Figure 6:
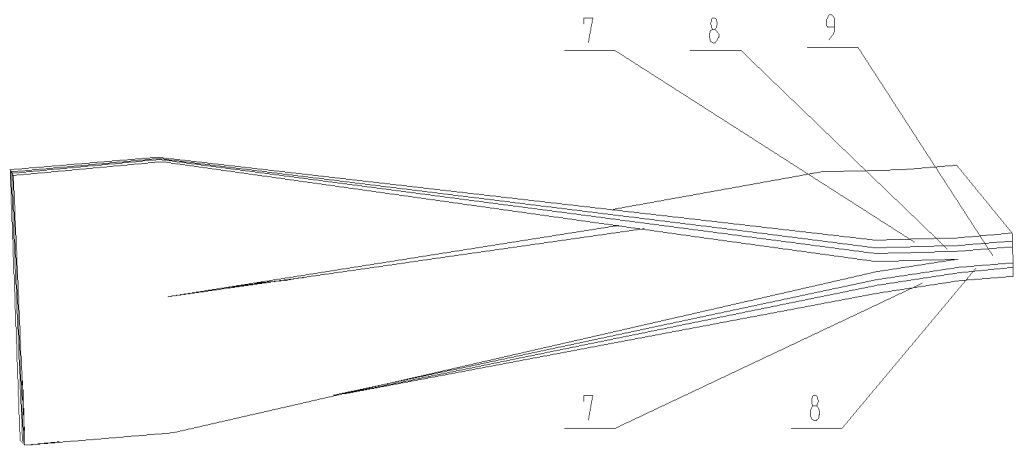
FIG. 6 is a principle diagram of fluid partition, rotation, lamination and composition in a reverse laminator of an apparatus for preparing laminated nano-composite material according to an embodiment of the present disclosure.

In the embodiment of the present disclosure, referring to FIG. 6, the composite melt is evenly divided into m equals in the width direction when entering the reverse laminator 34. Each equal melt rotates in the homodromous branch laminated runner for example approximately 90 degrees clockwise and in the reverse branch laminated runner for example by approximately 90 degrees counterclockwise. During the rotation, the m equals of melts expand for m times, respectively, each equal melt has a thickness of 1/m of the original thickness, and then converges at the melt outlet channel. In the embodiment of the present disclosure, due to the existence of the reverse branch laminated runners, the melt materials on the inner side are transferred to the outer side, and join together and form a laminated structure melt with a total thickness the same as the inlet thickness at the melt outlet channel. The layer sequences of the melts are changed after the convergence.

Figure 5:
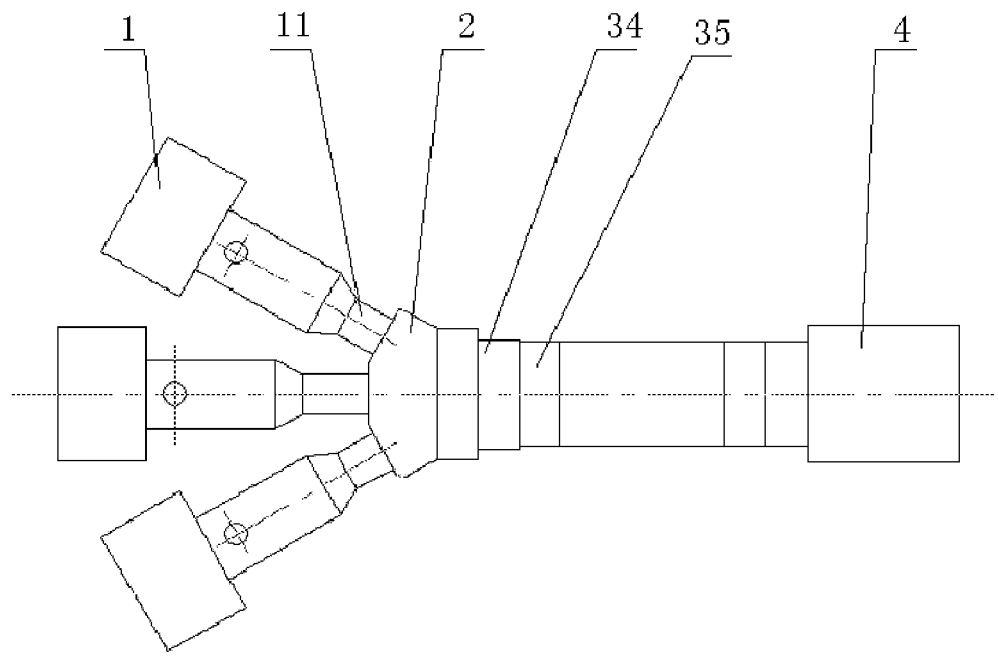
FIG. 5 is still another structure diagram of an apparatus for preparing laminated nano-composite material according to an embodiment of the present disclosure.
Figure 7:
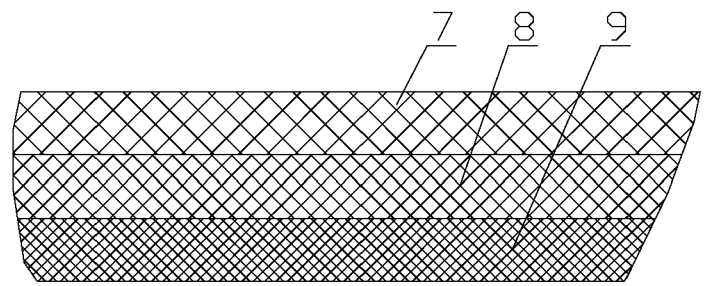
FIG. 7 is a cross-section diagram of the fluid as illustrated in FIG. 6 at a melt inlet channel when entering the reverse laminator.

In the apparatus for preparing laminated nano-composite material according to the embodiment of the present disclosure as illustrated in FIG. 5, there are three plasticizing-and-feeding devices 1, which are for example filled with fluid matrix material, adhesive material and barrier material, respectively. The current collector 2 laminates the three layers of materials (fluid matrix material, adhesive material and barrier material) coming from the three plasticizing-and-feeding device into a composite melt having an ABC structure, as illustrated in FIG. 7. In this embodiment, the matrix material 7 is represented by A, and usually employs PE; the adhesive material 8 is represented by B, and usually employs EVA; and the barrier material 9 is represented by C, and usually employs EVOH.

Figure 8:
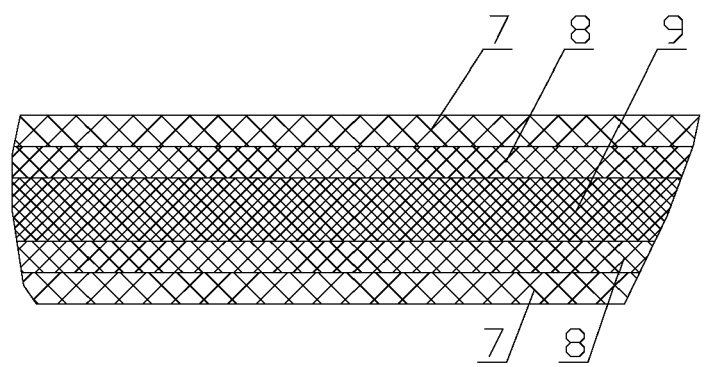
FIG. 8 is a cross-section diagram of the fluid as illustrated in FIG. 6 at a melt outlet channel when passing the reverse laminator.

The composite melt is evenly divided into m equals in the width direction in the vicinity of the melt inlet channel, for example m=2. Each equal melt reversely rotates approximately 90 degrees and expands for 2 times (i.e., the thickness is halved) as it flows forward in the reverse branch laminated runner of the reverse laminator 34, so as to form a branch fluid. After the composite melt in the reverse branch laminated runner rotates, in case two layers of composite melts join together, the barrier material 9 is wrapped therebetween and the matrix material 7 is at the outermost of the fluid composite layer, as illustrated in FIG. 8, the melts join together and form a fluid of ABCCBA six-layer laminated structure at the melt outlet channel of the reverse laminator, wherein two layers of barrier materials 9 join together.

Figure 9:
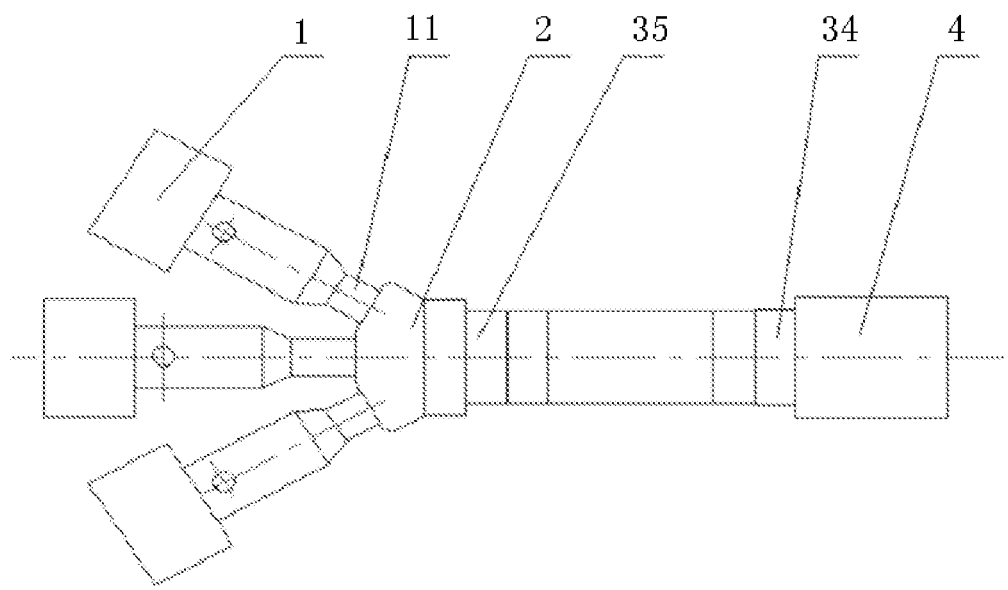
FIG. 9 is yet another structure diagram of an apparatus for preparing laminated nano-composite material according to an embodiment of the present disclosure, in which the reverse laminator is connected to the forming device.

In another embodiment of the present disclosure, the laminated composite generator 3 is a combination of a reverse laminator 34 and a homodromous laminator 35, wherein the reverse laminator 34 may be connected in front of or behind the homodromous laminator 35, as illustrated in FIGS. 5 and 9. The number of the reverse laminator 34 is larger than or equal to 1. In m branch laminated runners of the reverse laminator 34, at least one branch laminated runner is the reverse branch laminated runner, while others are homodromous branch laminated runners. The rotation directions of the composite melts continuing flowing forwards in the reverse branch laminated runners are reverse to those of the composite melts continuing flowing forwards in the homodromous branch laminated runners. The m branch laminated runners in the homodromous laminator 35 are all homodromous branch laminated runners, and the composite melts therein have the same rotation direction as it flows forward.

For example, the homodromous laminator 35 may be connected behind the reverse laminator 34. For example, the homodromous laminator 35 evenly divides the fluid joining together by the reverse laminator 34 into four equals in the width direction. Each equal melt homodromously rotates approximately 90 degrees and expands for four times (i.e., the thickness is quartered) as it flows forward in the homodromous branch laminated runner of the homodromous laminator 35, so as to form a branch fluid. The melts join together and form a laminated structure melt of 6×4 layers at the melt outlet channel. Since the laminated material entering the homodromous laminator 35 has the ABCCBA structure and the A-matrix material is externally located, the matrix materials 7 directly join together during the convergence of the divided melts, and the adhesive material 8 and the barrier material 9 are wrapped in the layers, as illustrated in FIG. 8. As a result, k homodromous laminators 35 are in serial communication with each other to obtain a fluid of $6 \times 4^k$ layers. The fluid inlet of the forming device 4 has the same shape as the melt outlet channel of the homodromous laminator 35. In the forming device 4, the fluid of $6 \times 4^k$ layers gradually transits to the cross-section size required by the die, and finally shaped to obtain the product.

In the embodiment, the polymer fluids of three compositions join together and then pass through two-equal reverse laminator 34, and k identical four-equal homodromous laminators 35 are in serial communication_ with each other, so as to obtain a composite material with $6 \times 4^k$ layers. The layer thickness may reach the level of micrometer or nanometer. Thus the device can be used to prepare micro-nano-composite materials.

In which, the branch laminated runners of the reverse laminator 34 and the homodromous laminator 35 may be processed through a precision casting or an electroplating. Alternatively, the reverse laminator 34 and the homodromous laminator 35 may be cut into slices, and each slice undergoes a numerical control machining to obtain the required channel shape, and then assembled into the reverse laminator 34 and the homodromous laminator 35.

Other structures, work principles and beneficial effects of the embodiment are the same as those of Embodiment 1, and herein are omitted.

Embodiment 3

In the embodiment of the present disclosure, the laminated composite generator 3 adjacently connected to the current collector 2 is a reverse laminator 34 having two branch laminated runners 31 therein, then k reverse laminators 34 or homodromous laminators 35 having m branch laminated runners are connected in series.

As can be seen from the example illustrated in FIG. 6, the melts flowing out from the reverse laminator 34 having two branch laminated runners 31 have the layer sequence ABC-CBA. Regardless of the structure of the reverse laminator 34 and/or homodromous laminator 35 to be connected, the layer sequence is a superposition of ABCCBA, i.e., the barrier material and the adhesive material are wrapped in the matrix material, and the outermost layer of the melt is the matrix material. The composite fluids contact the same material when they join together again, and obtain well adhesion. In addition, the composite fluid structure has a good symmetry and the calculation of layer thickness is simple. Further, in case there are n plasticizing-and-feeding device 1, the melt coming from the reverse laminator 34 having two branch laminated runners 31 has 2n layers, and from the last reverse or homodromous laminator there comes a multi-layer structured composite material with $2n \times m^k$ layers.

The apparatus for preparing laminated nano-composite material according to the embodiment of the present disclosure has a high barrier property, and can be widely used to prepare various laminated composite materials, particularly laminated micro-nano-composite material. With respect to the barrier property, the multi-layer structure has a better barrier property under the same total thickness of the barrier material. In addition, the cost of the barrier material is usually high, while a thin barrier layer can meet the requirement on some occasions. However, the traditional method cannot produce any ultra-thin layer product, while the apparatus of the present disclosure can achieve a composite product having the thickness of micrometer or nanometer level. The product types include polymer composite material, in this field, films, plates and profiles can be directly produced, and master batches may also be produced. The apparatus of the present disclosure can also be applied to the fields such as polymer-based, ceramic-based and metal-based composite materials. The barrier layer is wrapped to the inner layer to prevent a waste of extra barrier material adhered to the channel wall of the laminator. The matrix material has good comprehensive properties and located at the outermost layer, so that the composite product has good comprehensive properties such as weather resistance and heat resistance, thereby exerting the optimal properties of various materials.

In the embodiment of the present disclosure, high barrier laminated micro-nano-composite material products of various layer thicknesses can be obtained through different combinations of the reverse laminator 34 and the homodromous laminator 35, and the structures are diversified. Since the modularized structure is employed, it is easy to use the apparatus.

Other structures, work principles and beneficial effects of the embodiment are the same as those of Embodiment 2, and herein are omitted.

Embodiment 4

Referring to FIG. 9, the apparatus for preparing laminated nano-composite material provided by the embodiment of the present disclosure comprises a plasticizing-and-feeding device 1, a connector 11, a current collector 2, k homodromous laminators 35, a reverse laminator 34 and a forming device 4 serially connected in sequence, wherein the reverse laminator 34 is arranged in front of the forming device 4, and the plasticizing-and-feeding device 1 includes three extruders.

The inlet of the current collector 2 is in communication with the outlet of the connector 11, and the channel in the connector 11 is a rectangular channel that gradually transits from the cylindrical channel of the inlet segment to the outlet segment. The current collector 2 laminates three fluids (matrix material 7, adhesive material 8 and barrier material 9) coming from the three extruders of the plasticizing-and-feeding device 1 into a composite fluid with the ABCB structure, wherein the adhesive material 8 occupies two layers. For the convenience of understanding, the matrix material 7 is represented by symbol A, and usually employs PE; the adhesive material 8 is represented by B, and usually employs EVA; and the barrier material 9 is represented by C, and usually employs EVOH.

Figure 10:
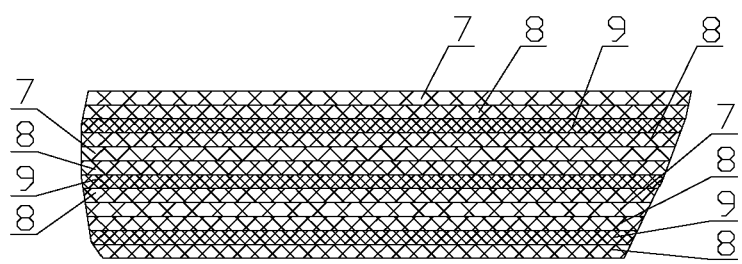
FIG. 10 is a fluid cross-section diagram of a composite fluid obtained by connecting a current collector and a homodromous laminator of an apparatus for preparing laminated nano-composite material according to an embodiment of the present disclosure.

The four-layered polymer fluid ABCB is evenly divided into three equals in the width direction in the vicinity of the melt inlet channel of the first homodromous laminators 35. Each equal melt homodromously rotates approximately 90 degrees and expands for 3 times (i.e., the thickness is trisected) as it flows forward in the branch laminated runner of the homodromous laminator 35, so as to form a branch fluid. The melts join together and form a fluid of 4×3-layer laminated structure at the melt outlet channel, as illustrated in FIG. 10. A fluid of $4 \times 3^k$ layers is obtained when the fluid of the laminated structure leaves the $k^{th}$ homodromous laminator 35.

Figure 11:
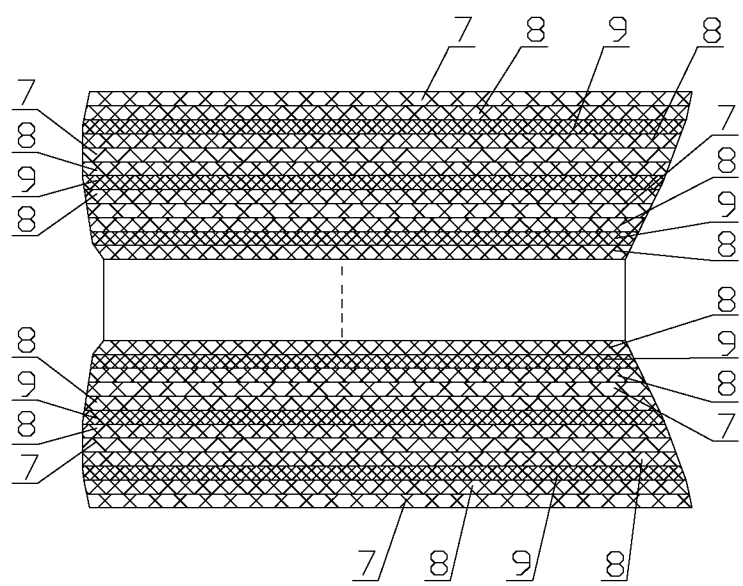
FIG. 11 is an enlarged fluid cross-section diagram of a composite fluid obtained by connecting a current collector to several homodromous laminators and then to a reverse laminator of an apparatus for preparing laminated nano-composite material according to an embodiment of the present disclosure.

The fluid of $4 \times 3^k$ layers enters the reverse laminator 34, and it is evenly divided into three equals in the width direction in the vicinity of the melt inlet channel of the reverse laminator 34. Each equal melt reversely rotates approximately 90 degrees and expands for 3 times (i.e., the thickness is trisected) as it flows forward in the branch laminated runner of the reverse laminator 34, so as to form a branch fluid. After the reverse rotation, during the fluid convergence, the barrier material 9 is wrapped between the fluids and becomes one layer, and the matrix material 7 is located at the outermost of the fluid composite layer, as illustrated in FIG. 11, the melts join together at the melt outlet channel of the reverse laminator 34, and form a fluid of ABCB . . . ABCBABCB . . . ABCBBCBA . . . BCBA laminated structure having $4 \times 3^k \times 3$ layers, wherein the arrangement of the previous $4 \times 3^k \times 2$ layers of the composite fluid is ABCB . . . ABCBABCB . . . ABCB, and the arrangement of the remained $4 \times 3^k \times 1$ layers is BCBA . . . BCBA, and finally the two equals are combined. The outermost layer of the composite fluid is still the matrix material 7, and the adhesive material 8 separates the matrix material 7 and the barrier material 9.

Other structures, work principles and beneficial effects of the embodiment are the same as those of Embodiment 2, and herein are omitted.

Embodiment 5

The embodiment of the present disclosure provides a method for preparing laminated nano-composite material, comprising:

materials are fed into n plasticizing-and-feeding device 1 and become substantially uniform fluids under the action of the plasticizing-and-feeding device 1, then transported to the current collector 2 by the plasticizing-and-feeding device 1, and the fluids substantially uniformly join together and form a multi-layered composite melt with substantially uniform wall thickness at the conjunction runners in the current collector 2;

From the outlet of the current collector 2 the composite melt enters k laminated composite generators 3 in serial communication with each other, each comprising a melt inlet channel, m branch laminated runners 31 and a melt outlet channel. In the vicinity of each melt inlet channel the composite melt is evenly divided into m equals in the width direction. Each equal composite melt rotates by approximately 90 degrees and expands for m times as it flows forward in corresponding branch laminated runner, and joins together again and forms a laminated structure melt at the melt outlet channel. The laminated structure melt formed at the melt outlet channel of the last laminated composite generator 3 has $n \times m^k$ layers, wherein n and m are integers of no less than 2, and k is an integer of no less than 1;

The laminated structure melt flowing out from the melt outlet channel of the last laminated composite generator 3 enters the forming device 4 for being processed and shaped into a product.

Other structures, work principles and beneficial effects of the embodiment are the same as those of Embodiment 1, and herein are omitted.

The above descriptions are just several embodiments of the present disclosure, and based on the disclosure of the present disclosure, a person skilled in the art can make various changes or modifications to the embodiments of the present disclosure, without deviating from the spirit and scope of the present disclosure.

What is claimed is:

1. An apparatus for preparing laminated nano-composite material, comprising:
a plasticizing-and-feeding device assembly having n plasticizing-and-feeding devices;
a current collector having n inlets and an outlet, wherein each of the inlets is in communication with a corresponding one of the plasticizing-and-feeding devices, and there is a conjunction runner between the inlets and the outlet to laminate multiple layers of polymer melts into a first composite melt;
k laminated composite generators in serial communication with each other, a first laminated composite generator is in serial communication with the outlet of the current collector, each of the laminated composite generators comprises a melt inlet channel, m branch laminated runners and a melt outlet channel, in a vicinity of each of the melt inlet channels m distributary openings are distributed substantially evenly in a width direction to divide the first composite melt into m substantially equal second composite melts, each of the branch laminated runners to enable each equal second composite melt flowing out from each of the distributary openings to rotate approximately 90 degrees and to expand as each second composite melt flows forward, and to join together and form a laminated structure melt at the melt outlet channel, the laminated structure melt formed at the melt outlet channel of a last laminated composite generator to have $n \times m^k$ layers, wherein n and m are integers of no less than 2, and k is an integer of no less than 1; and
a forming device connected to the melt outlet channel of the last laminated composite generator in series.

2. The apparatus of claim 1, wherein at least one of:
the m distributary openings are arranged on each of the melt inlet channels;
m distributary openings are arranged at the outlet of the current collector, and m distributary openings are arranged in the melt outlet channels of previous (k−1) laminated composite generators; or
m distributary openings are arranged at the outlet of the current collector, and m distributary openings are arranged in the melt inlet channels of the $2^{nd}$ to $k^{th}$ laminated composite generators.

3. The apparatus of claim 2, wherein at least one of the laminated composite generators is a reverse laminator, and the number thereof is larger than or equal to 1, in the m branch laminated runners of the reverse laminator, at least one branch laminated runner is a reverse branch laminated runner, while other branch laminated runners are homodromous branch laminated runners, rotation directions of the composite melts flowing forward in the reverse branch laminated runners are reverse to those of the composite melts flowing forward in the homodromous branch laminated runners, and rotation directions of the composite melts flowing forward in the homodromous branch laminated runners are the same as each other.

4. The apparatus of claim 2, wherein the laminated composite generator is a combination of a reverse laminator and an homodromous laminator, the reverse laminator is connected in front of or behind the homodromous laminator, a number of the reverse laminator is larger than or equal to 1; in the m branch laminated runners of the reverse laminator, at least one branch laminated runner is the reverse branch laminated runner, while others are homodromous branch laminated runners, rotation directions of the composite melts flowing forward in the reverse branch laminated runners are reverse to those of the composite melts flowing forward in the homodromous branch laminated runners; and the m branch laminated runners in the homodromous laminator are all homodromous branch laminated runners, and the composite melts therein have a same rotation direction as the composite melts flow forward.

5. The apparatus of claim 3, wherein the first laminated composite generator is a reverse laminator having two branch laminated runners therein, behind which k reverse or homodromous laminators having m branch laminated runners are connected in series.

6. The apparatus of claim 1, wherein the plasticizing-and-feeding device is an extruder, an injection molding device of an injection molding machine or a die casting machine.

7. The apparatus of claim 1, wherein the forming device is an extruder head, a combination of injection nozzle and die, or a pressing die.

8. The apparatus of claim 1, wherein a connector is connected between each of the inlets of the current collector and each of the plasticizing-and-feeding device, a runner of the connector defines a rectangular channel which gradually transitions from an inlet segment channel of the connector in correspondence with the outlet of the plasticizing-and-feeding device to an outlet segment channel of the connector.

* * * * *